(12) United States Patent
Huang

(10) Patent No.: US 6,890,460 B2
(45) Date of Patent: *May 10, 2005

(54) METHOD FOR MANUFACTURING LENS CAP FOR OPTICAL MODULE

(75) Inventor: Nan Tsung Huang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 350 days.

This patent is subject to a terminal disclaimer.

(21) Appl. No.: 10/198,922

(22) Filed: Jul. 18, 2002

(65) Prior Publication Data
US 2003/0197293 A1 Oct. 23, 2003

(30) Foreign Application Priority Data
Apr. 18, 2002 (TW) ........................................ 91107989 A

(51) Int. Cl.⁷ .............................................. B29D 11/00
(52) U.S. Cl. ................... 264/1.7; 257/434; 264/272.17; 264/274; 359/811

(58) Field of Search ..................... 264/1.1, 1.7, 272.17, 264/274; 359/811, 900; 257/433, 434; 425/808

(56) References Cited

U.S. PATENT DOCUMENTS

| | | | | | |
|---|---|---|---|---|---|
| 4,217,683 A | * | 8/1980 | Cardinal | ....................... | 445/44 |
| 5,838,703 A | * | 11/1998 | Lebby et al. | .................. | 372/43 |
| 5,939,773 A | * | 8/1999 | Jiang et al. | .................. | 257/666 |
| 6,614,602 B1 | * | 9/2003 | Huang | ......................... | 359/811 |

* cited by examiner

*Primary Examiner*—Mathieu D. Vargot
(74) *Attorney, Agent, or Firm*—Wei Te Chung

(57) ABSTRACT

Disclosed is a method for manufacturing a lens cap (20) for an optical module. The lens cap includes a housing (21) and an optical lens (22). The housing includes a sidewall (23) and a top wall (24) connecting with the sidewall. The top wall has an inclined portion (241) defining a through-hole (243) therein, and the through-hole includes a window (244) and an injection void (245) connecting with the window. The optical lens is made of optical plastic and is formed in the through-hole using insert-molding. The optical lens transmits and reflects light.

7 Claims, 3 Drawing Sheets

METHOD FOR MANUFACTURING LENS CAP FOR OPTICAL MODULE

CROSS-REFERENCE TO RELATED APPLICATIONS

This application is a co-pending application of patent applications with Ser. Nos. 10/152,409 and 10/175,992, respectively entitled LENS CAP FOR OPTICAL MODULE and METHOD FOR MANUFACTURING SEMICONDUCTOR LASER PACKAGE, invented by the same inventor and assigned to the same assignee of this application, and filed on May 20, 2002 and Jun. 19, 2002 respectively. The disclosures of the related applications are wholly incorporated herein by reference.

BACKGROUND OF THE INVENTION

1. Field of the Invention

The present invention relates to a method for manufacturing a lens cap, and particularly to a method for manufacturing a lens cap for an optical module such as a transceiver, an optical sub assembly, or a semiconductor laser device.

2. Related Art

The field of optical communication is developing rapidly, and optical modules having greater performance are being designed to satisfy new system needs. Since optical modules, such as laser devices, are easily affected by their environments, the major optical elements of an optical module are generally sealed in a structure such as a lens cap.

A conventional laser device is disclosed in Japanese Patent Publication No. 63-84184 (see FIG. 5). The laser device 10 includes a base 11 and a lens cap 18. The lens cap 18 includes a housing 16 and a glass plate 17. A laser diode 14 and an optical detector 15 are received in an enclosure formed by engagement of the housing 16 to the base 11. The housing 16 includes an inclined plane 12 on a top thereof, which defines an opening 13 therein for transmission of a beam of light. The glass plate 17 is attached to the housing using adhesive to cover the opening 13, and functions to transmit and reflect beams of light and to seal the enclosure. A beam of light emitted by the laser diode 14 is divided into two portions by the glass plate 17, one portion being transmitted through the opening 13 via the glass plate 17, and the other portion being reflected into the optical detector 15 by the glass plate 17, and thereby being detected.

However, since the glass plate 17 is attached to the housing 16 by adhesive, and adhesive is easily smeared, the glass plate can be contaminated by smeared adhesive and the transmittance of the glass plate can therefore be affected. Moreover, some adhesives are susceptible to losing strength under mechanical impact or in high temperature environments, which can reduce performance of the device. Furthermore, using adhesive complicates the manufacture and makes the device more expensive.

Accordingly, an improved lens cap for an optical module and a method for making the same are desired to overcome the above problems.

SUMMARY OF THE INVENTION

An object of the present invention is to provide a method for easily manufacturing a lens cap for an optical module which can ensure stable performance of the module.

To achieve the above object, a lens cap for an optical module and a method for making the same are disclosed. A lens cap for an optical module in accordance with a preferred embodiment of the present invention includes a housing and an optical lens. The housing includes a sidewall and a top wall connecting with the sidewall. The top wall has an inclined portion defining a through-hole, which includes a window and an injection void connecting with the window. The optical lens is made of optical plastic and is formed in the through-hole using insert-molding techniques. The optical lens allows transmission and reflection of a beam of light and provides a more easily manufactured lens cap.

These and additional objects, features and advantages of the present invention will become apparent after reading the following detailed description of a preferred embodiment of the invention taken in conjunction with the appended drawings.

DETAILED DESCRIPTION OF THE INVENTION

Figure 1:
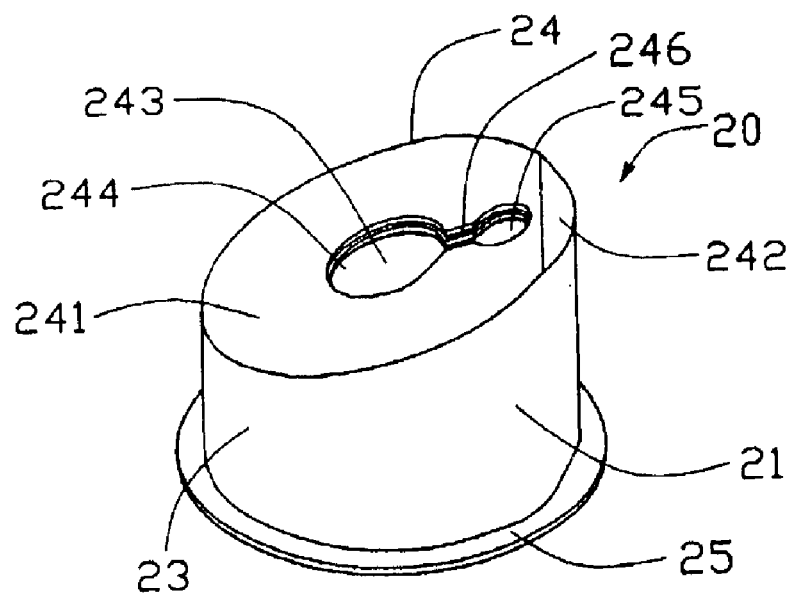
FIG. 1 is a perspective view of a lens cap for an optical module according to the present invention, without an optical lens.
Figure 2:
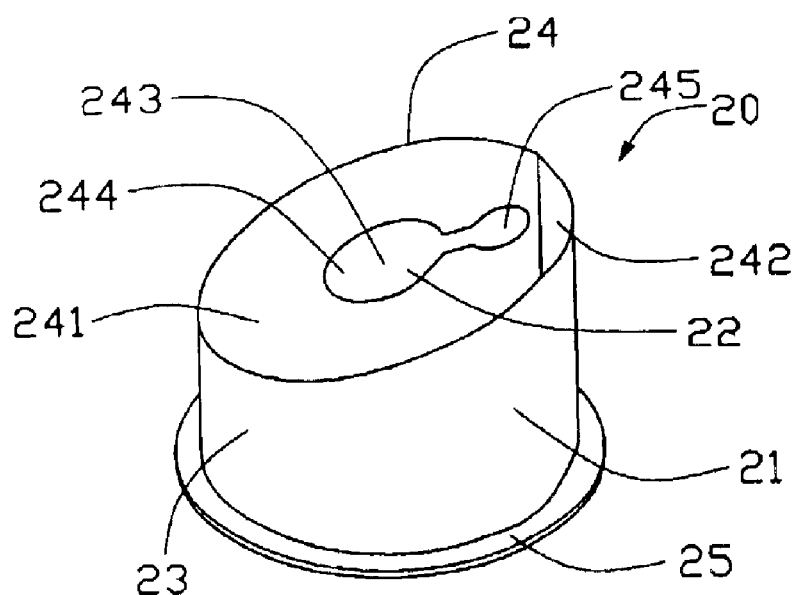
FIG. 2 is a perspective view of the lens cap of FIG. 1, with the optical lens.
Figure 3:
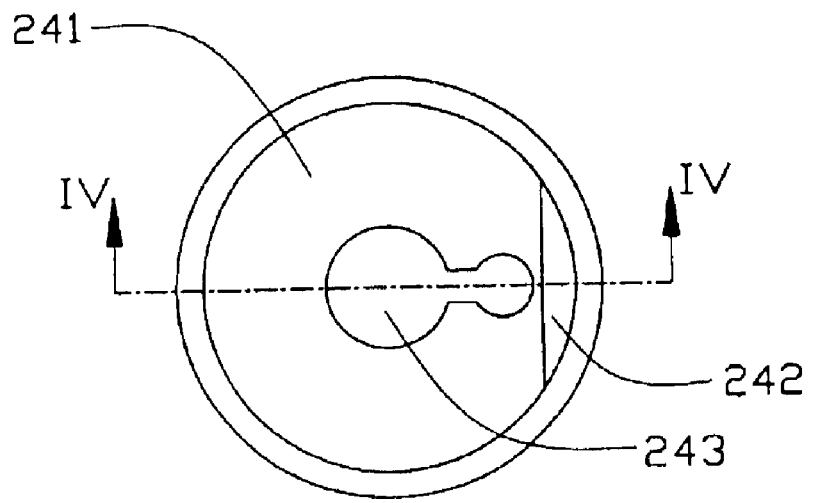
FIG. 3 is a top view of the lens cap of FIG. 2.
Figure 4:
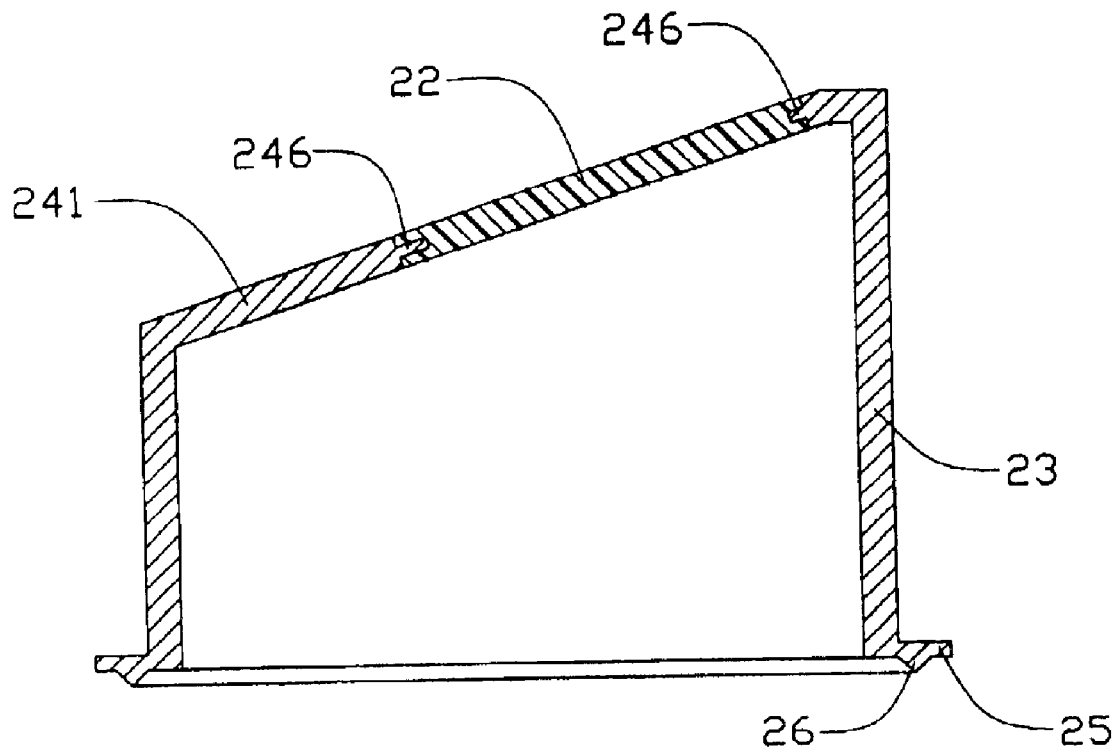
FIG. 4 is a cross-sectional view of the lens cap of FIG. 2, taken along line IV—IV of FIG. 3.
Figure 5:
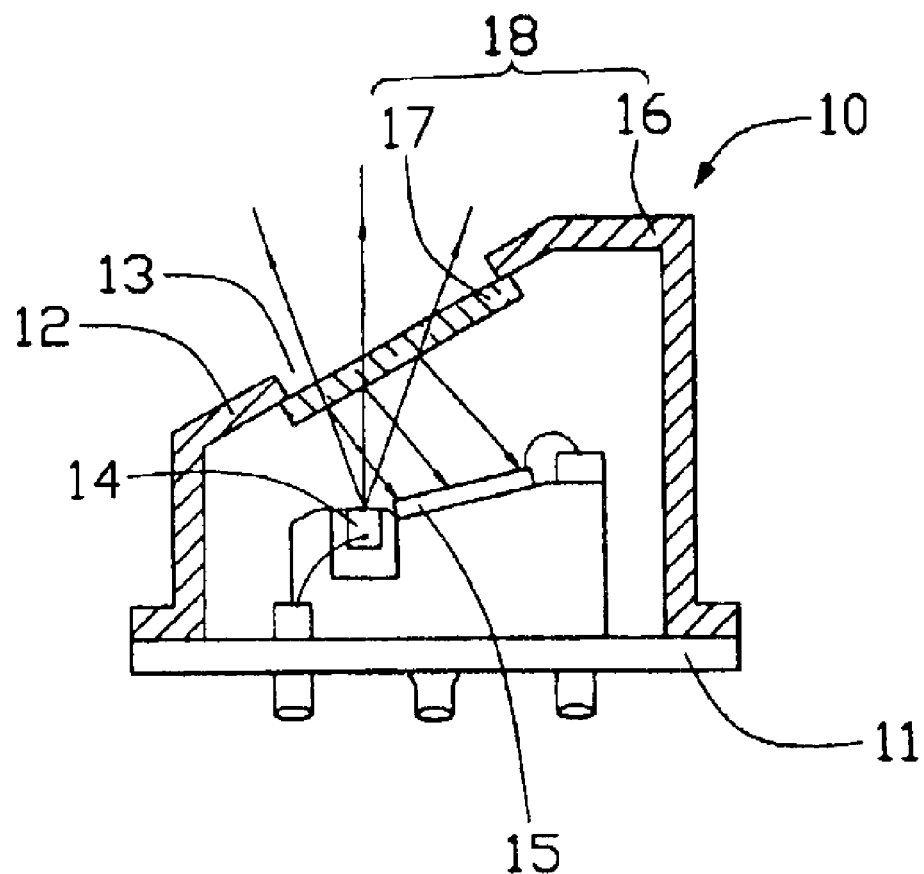
FIG. 5 is a partly cross-sectional view of a conventional laser device.

Referring to FIGS. 1–4, a lens cap 20 for an optical module in accordance with a preferred embodiment of the present invention Includes a housing 21 and an optical lens 22. The housing may be made of a metallic material, or may be made of another suitable material.

The housing 21 includes a cylindrical sidewall 23 and a top wall 24 connecting with the sidewall 23. An annular flange 25 extends outwardly from a bottom of the sidewall 23, and an annular boss 26 protrudes downwardly from the flange 25. The flange 25 and the boss 26 help seal the lens cap to a base (not shown) on which optical elements (not shown), such as a laser diode and an optical detector, are mounted. The top wall 24 includes an inclined portion 241 and a horizontal portion 242 connecting with the inclined portion 241. A through-hole 243 is defined in the inclined portion 241 and includes a window 244 for transmitting a beam of light therethrough and an injection void 245 connecting with the window 244. The drawings show the injection void 245 penetrating all the way through the inclined portion 241, but it may also be a recess in the inclined portion 241. A holding portion 246 is formed on an edge of the through-hole 243, protruding into the through-hole 243.

The optical lens 22 is formed in the through-hole 243 by insert-molding. The optical lens 22 is made of optical plastic which transmits and reflects light.

The method for forming the optical lens 22 in the through-hole 243 includes the steps of: (1) placing the housing 21 in a corresponding insert-molding mold (not shown) and then closing the molds arranged so that an injection entry of the mold aligns with the injection void 245; (2) preheating optical plastic to a certain viscosity and injecting the melted plastic into the mold at the injection void 245 of the housing 21, the melted optical plastic filling the injection void 245, flowing from the injection void 245 into the window 244 and filling the window 244; (3) opening the mold, after the optical plastic has been cooled and cured, and extracting the housing 21 with the newly formed optical lens 22. The shape of the optical lens 22 matches that of the through-hole 243 and is secured In the through-hole 243 by the holding portion 246. The optical lens 22 is designed so that when a beam of light is emitted from any of the optical elements, one portion of the light beam is transmitted through the optical lens 22, and the other portion is reflected by the optical lens 22.

Anti-reflective films can be deposited on the surfaces of the optical lens 22 to increase the transmittance of the optical lens 22.

Using the insert-molding method, the optical lens 22 can be securely formed in the housing 21 without using adhesives. Therefore the lens cap 20 provides dependable protection from impact for optical components mounted within, and is less affected by temperature changes than a lens cap constructed with certain adhesives. The optical lens 22 of the present invention achieves satisfactory performance using less labor during manufacturing, and can be produced at a lower cost.

Although the present invention has been described with reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

I claim:

1. A method for manufacture of a lens cap for an optical module, comprising the steps of:
   (1) providing a housing including an inclined portion on a wall thereof, the inclined portion defining a window extending through the wall and an entry for injection of optical material, the entry connecting with the window;
   (2) providing an insert-molding mold corresponding to the housing, placing the housing in the mold and aligning an injection entry of the mold with the entry of the housing;
   (3) providing an optical plastic and injecting the melted plastic into the entry of the housing to fill the entry and the window of the housing; and
   (4) extracting the housing from the mold after the injected optical plastic is cooled and cured.

2. The method as claimed in claim 1, wherein the entry is a recess.

3. The method as claimed in claim 1, wherein the housing includes a through-hole, and the through-hole includes the window and the entry.

4. The method as claimed in claim 3, wherein an edge of the through-hole forms a holding portion for securing an optical lens in the through-hole.

5. The method as claimed in claim 4, wherein the holding portion is in the shape of a ridge and protrudes into the through-hole.

6. The method as claimed in claim 1, wherein an edge of the window forms a holding portion.

7. A method for manufacture of a lens cap for an optical module, comprising the steps of:
   (1) providing a housing with a top portion defining therein a through hole including a window and an entry for plastic both extending therethrough and laterally communicating with each other;
   (2) insert-molding the housing to have the through hole filled with melted plastic; and
   (3) keeping the solidified plastic flush with two opposite surfaces of the top portion; wherein
   said entry is smaller than and elevated above said window.

* * * * *